United States Patent [19]

Moore et al.

[11] Patent Number: 5,119,001

[45] Date of Patent: Jun. 2, 1992

[54] FREQUENCY CONTROLLED OSCILLATING PET TOY

[76] Inventors: Herbert A. Moore, 287 King George Dr., Flint, Mich. 48507; Al L. Wilson, 8071 Green Valley Dr., Grand Blanc, Mich. 48439

[21] Appl. No.: 700,978

[22] Filed: May 15, 1991

[51] Int. Cl.⁵ .................. H02P 7/06; A01K 15/02; A63H 29/22
[52] U.S. Cl. .................. 318/257; 318/280; 318/293; 318/281; 119/29; 446/247
[58] Field of Search .............. 318/256, 257, 280, 283, 318/287, 291, 293, 294, 445, 484, 281; 119/29, 29.5; 446/3, 236, 247, 268, 269, 330, 352, 358, 484, 491

[56] References Cited

U.S. PATENT DOCUMENTS 4,930,448 6/1990 Robinson .................. 119/29

Primary Examiner—Bentsu Ro
Attorney, Agent, or Firm—Donald C. Bolger

[57] ABSTRACT

A novel electric, gear driven, frequency controlled oscillating device that oscillates a toy mouse or other toys to amuse, occupy, and entertain pets. Because this unit is gear driven, it provides enough torque to insure self restarting after being stopped by a playful cat. The device has a low profile, thereby making it difficult to tip over. The cat toy operates in a very low variable voltage range, 6 volts DC, for maximum safety. The device is battery operated and has no exposed wires for pets to chew on. Device may be mounted in virtually any plane for further variation.

8 Claims, 3 Drawing Sheets

FREQUENCY CONTROLLED OSCILLATING PET TOY

BACKGROUND OF THE INVENTION

The field of the invention is generally that of amusement devices, and more specifically, to a novel toy for pet animals which includes a stationary base having a frequency controlled oscillating means for propelling a suspended member.

The present invention is intended to be used primary as a toy for pets; pets of the feline family in particular. It is intended to provide amusement as well as a playful diversion for the pet an owner, at the same time providing a theater of learning for keeping sharp its natural skills as a hunter and as an outlet for its predatory energies. The pet toy is a frequency controlled, battery operated, rotating, gear-driven electric toy that needs only to be turned on and left to the amusement of the pet. Once it is initially turned on, it requires no further monitoring for it is self contained and operates in a very low battery voltage range of positive 6 volts direct current (d.c.) for maximum safety.

Cats are, by their predatory nature, attracted to motion, they are enticed by this device that rotates their suspended favorite cat toy, in an adjustable erratic manner always changing direction to provide a constantly changing field of play that tests the cats natural skills as a predator. Housecats, like people, are creatures of habit. When their very predictable environment becomes disrupted, for any reason, their territorial sense of security appears to become threatened and in many instances will manifest itself into symptoms of stress.

When there is only one cat in the household, it is denied the opportunity to inter act socially with other cats and it is the responsibility of the pet owner to provide the pet with a means to play, learn and exhaust its natural predatory aggressions sometimes caused by stress.

Stress symptoms in cats appear in many forms, the most common being, refusal to use the litter box. Other biological symptoms that are indicative of cat stress are loss of appetite, changes in heat cycles and sometimes even the loss of hair. Some common behavioral signs of stress are hiding, irritability and hissing.

The addition of this toy to a pet household may well provide a more tranquil environment at the same time establishing a closer bond between the pet and owner, as it provides amusement for the pet in the absence of the owner.

SUMMARY OF THE INVENTION

Generally speaking, the present invention comprises a novel electric, gear driven, frequency controlled oscillating device. Because this unit is gear driven, it provides enough torque to insure self restarting after being stopped by a playful cat. The device has a low profile, thereby making it difficult to tip over. The cat toy operates in a very low variable voltage range, 6 volts direct current (dc), for maximum safety.

By nature, cats are predators and have shown a tendency to chew on exposed cords. This device has no exposed wires, no cords and no power converters tying it to the potentially dangerous house current. Again, cats are predators and are particularly responsive to movement. The present invention, constantly oscillates at a variable rate of speed. In this configuration the cats are constantly provided with a moving target from a oscillating direction which entices the cat to use all of it's senses, vision, touch, hearing and sense of smell if cat nip is used. The device can be mounted in virtually any plane; upright, inverted, mounted on a wall or hung on a door knob.

It is an object of the present invention to provide a novel cat toy to amuse, occupy and entertain pets and owners.

It is a further object of the invention to provide a novel pet toy to helps cats that have grown over fearful, aggressive or have become poor hunters.

It is another object of the invention to provide a novel entertainment device that provides a learning environment, through play, to insure the physical, mental and social well-being of a normal, healthy and happy pet.

It is a further object of the invention to provide a novel battery operated, gear driven, variable speed device, however, household current could also be used.

It is another object of the invention to provide a low cost device that oscillates in direction.

Further objects are implicit in the detailed description which follows hereinafter (which is to be considered as exemplary of, but not specifically limiting, the present invention) and said objects will be apparent to persons skilled in the art after a careful study of the detailed description which follows. Transistors could be used instead of a relay.

For the purpose of clarifying the nature of the present invention, one exemplary embodiment of the invention is illustrated in the hereinbelow-described figures of the accompanying drawings and is described in detail hereinafter. It is to be taken as representative of the multiple embodiments of the invention which lie within the scope of the invention.

DESCRIPTION OF THE PREFERRED EMBODIMENTS

Figure 1:
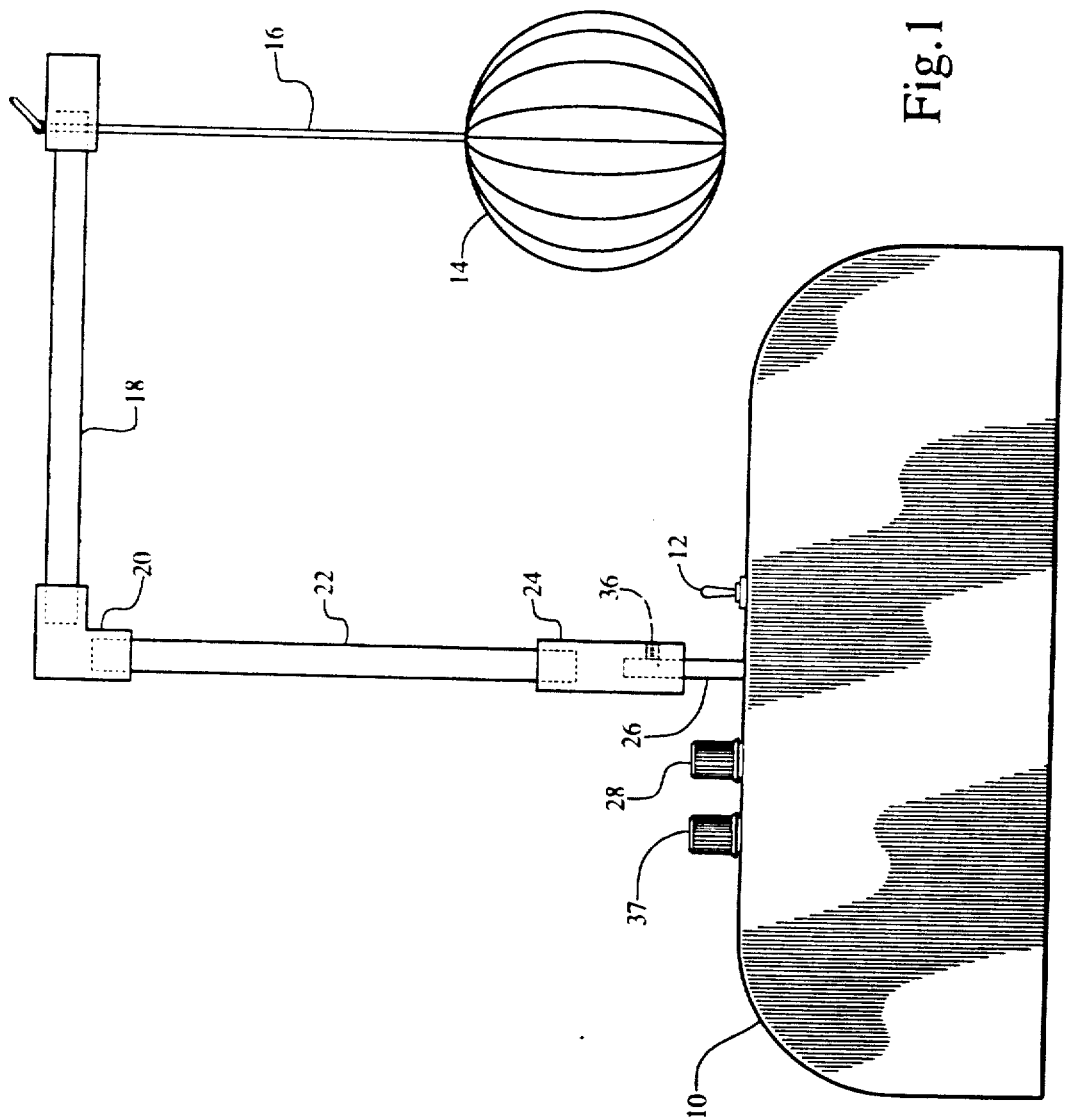
FIG. 1 is a perspective view showing one exemplary embodiment of one representative form of the invention.

Referring to FIG. 1, base 10 is a low profile support for toy 14 and is difficult to tip over. Switch 12 is mounted to base 10 and is used to turn device "on" and "off." Shaft/Bearing assembly 26 is also mounted to base 10 and rotates when switch 12 is in the "on" position. Connector 24 is placed over shaft/bearing assembly 26 and fastened by set screw 36. Vertical member 22 is fastened to connector 24 by gluing, however, other means such as threaded screw and jam nut, press fit, or use of a set screw could also be used. The first end of elbow 20 is secured to vertical member 22 by gluing. The first end of horizontal member 18 is secured to the second end of elbow 20 by gluing. The first end of line 16 is fastened to the second end of horizontal member 18 by tying, however, gluing or other type of fasteners could also be used. The second end of horizontal member 18 depending on manufacturing methods has a rubber safety tip to prevent injury to the cat. Toy 14 is fastened to the second end of line 16 by tying, however, gluing or other means could also be used. Variable resistor 28 controls speed of rotation, variable resistor 37 controls duty cycle in either direction.

Figure 2:
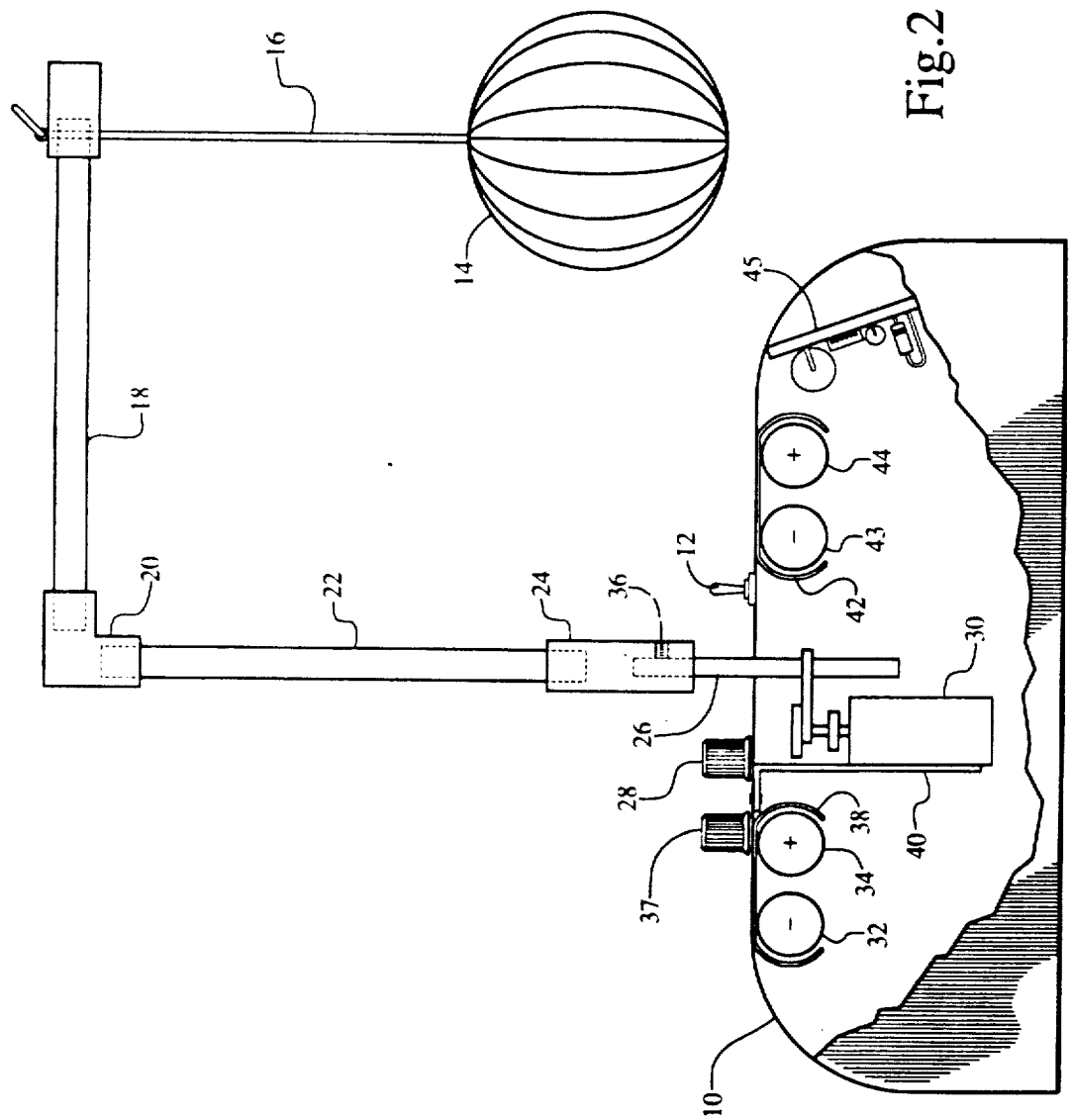
FIG. 2 is a partial cross section view showing one exemplary embodiment of one representative form of the invention.

Referring to FIG. 2, motor bracket 40 is secured to base 10 by screws, however, gluing or other fasteners could also be used. Motor 30 is connected to motor bracket 40 by screws, however, gluing or other fasteners could also be used. Variable resistor 28 is also attached to base 10 by gluing, however, a locking nut or other fasteners could also be used. Bracket 38 is attached to base 10 by gluing, however, screws or other fasteners could also be used. First battery 32 and second battery 24 are inserted into bracket 38 and held in place by spring tension.

Variable resistor 37 is attached to base 10 by gluing, however, a locking nut or other fasteners could also be used. Bracket 42 is fastened to base 10 by gluing, however, screws or other fasteners could also be used. Third battery 43 and fourth battery 44 are inserted into bracket 42 and are held in place by spring tension. Circuit board 45 is fastened to base 10 by gluing, however, screws or other fasteners could also be used.

Figure 3:
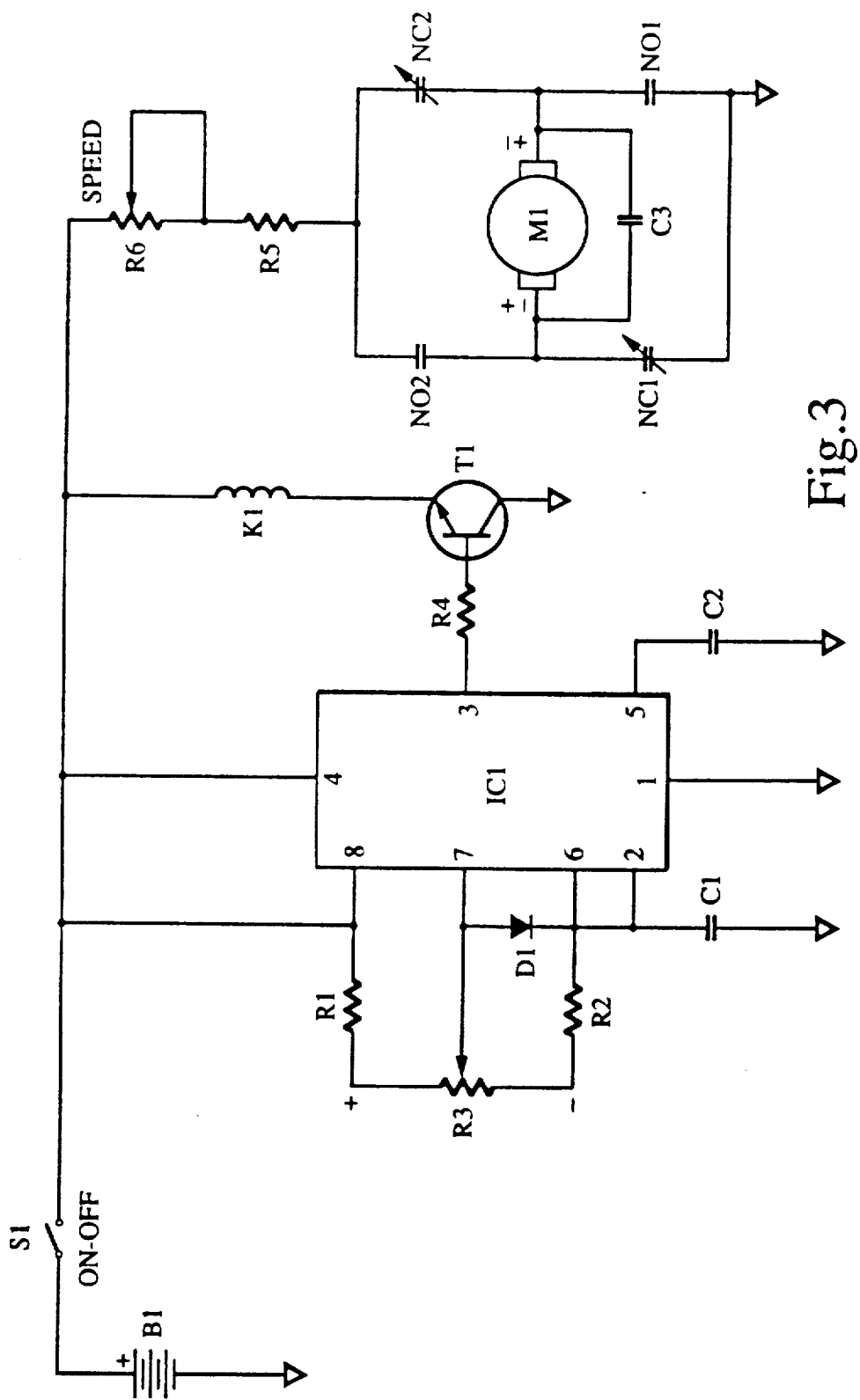
FIG. 3 is an electrical circuit diagram showing one exemplary embodiment of one representative form of the invention.

Referring to FIG. 3, when switch (S1) is closed, current is allowed to flow through 7555 Timer IC (IC1), having a ground (1), trigger (2), output (3), reset (4), control V (5), threshold (6), discharge (7), and Vcc (8) terminals. The 7555 Timer IC (IC1) ground (1) terminal to is connected to ground. A 200 uFds capacitor (C1) is connected between 7555 Timer IC (IC1) trigger (2) terminal and ground. A 0.01 uFds capacitor (C2) is connected between 7555 Timer IC (IC1) control V (5) terminal and ground.

The 7555 Timer IC (IC1) trigger (2) is connected to 755 Timer IC (IC1) threshold (6). The diode (D1) anode is connected to 7555 Timer IC (IC1) discharge (7) terminal. Diode (D1) cathode is connected to 7555 Timer IC (IC1) threshold (6) terminal.

A 10 Kohm resistor (R1), 10 Kohm resistor (R2), and variable 20 Kohm resistor (R3) are connected in series. The 7555 Timer IC (IC1) discharge (7) terminal is connected to said variable 20 ohm resistor (R3) variable terminal. The 10 Kohm resistor (R1) is connected between 7555 Timer IC (IC1) Vcc (8) terminal and variable 20 Kohm resistor (R3) first fixed terminal. The 10 Kohm resistor (R2) is connected between 7555 Timer IC (IC1) threshold (6)

MPS 222 NPN transistor (T1) has a base terminal, collector terminal, and emitter terminal. The 10 Kohm resistor (R4) is connected between 7555 Timer IC (IC1) output (3) terminal and said MPS 222 NPN transistor (T1) base terminal. The MPS 222 NPN transistor (T1) emitter terminal is connected to ground. The first terminal of inductor (K1) is connected to MPS 222 NPN transistor (T1) collector terminal.

A reversible motor (M1) has a first terminal and a second terminal. A 47 uFds capacitor (C3) is connected between reversible motor (M1) first terminal and reversible motor (M1) second terminal. The 47 uFds capacitor (C3) is connected electrically on the motor terminals.

A relay which has a first normally open contact with a first terminal and second terminal, a second normally open contact with a first terminal and a second terminal, a third normally closed contact with a first terminal and a second terminal, and a fourth normally closed contact terminal with a first terminal and a second terminal is connected to reversible motor (M1). The relay first normally open contact (NO1) is connected between reversible motor's (M1) second terminal and ground. The relay third normally closed contact (NC1) is connected between reversible motor's (M1) first terminal and ground. The relay's second normally open contact (NO2) is connected between reversible motor's (M1) first terminal and 13 ohm resistor's (R5) first terminal. The relay fourth normally closed contact (NC2) is connected between reversible motor's (M1) second terminal and 13 ohm resistor's (R5) first terminal.

The 13 ohm resistor's (R5) second terminal is connected to the 10 ohm (R6) variable resistor's first terminal. Ten ohm (R6) variable resistor's second terminal is connected to switch (S1) first terminal. Inductor (K1) second terminal is connected to switch (S1) first terminal. The 7555 Timer IC (IC1) Vcc (8) terminal is connected to switch (S1) first terminal.

Power source (B1) is a 6 volt direct current battery which is connected to switch (S1) and ground.

In operation, motor assembly 30 will rotate at an oscillating frequency determined by 200 uFds capacitor (C1), 10 Kohm resistor (R2), variable 20 Kohm resistor (R3), and 10 Kohm resistor (R1). By adjusting variable 20 Kohm resistor (R3), the duty cycle or deflection in either direction is controlled. The motor assembly 30 output shaft rotating at approximately 16 to 32 RPM is coupled to a vertical member 22 through a coupling 24 and secured by set screw 36. Vertical member 22 now rotates at the same RPM as horizontal member 18 through elbow 20. Horizontal member 18 will now rotate while suspending toy mouse 14. However, a bird, fish or other toy could also be used. In this rotating configuration the cat is provided with a moving target which entices the cat to use all of its senses, vision, touch, hearing, and sense of smell, if cat nip is employed in conjunction with this device.

What is claimed is:

1. In an electric, gear driven, variable speed device that rotates a toy to amuse cats, a frequency oscillator circuit for controlling the direction and speed of the variable speed device comprising:

a timer IC, having a ground, trigger, output, reset, control V, threshold, discharge, and Vcc terminals;
means for connecting said timer IC ground terminal to ground;
a first capacitor;
means for connecting said first capacitor between said timer IC trigger terminal and ground;
a second capacitor;
means for connecting said second capacitor between said timer IC control V terminal and ground;
means for connecting said timer IC trigger terminal to said timer IC threshold terminal;
a diode having an anode and a cathode;
means for connecting said diode anode to said timer IC discharge terminal;
means for connecting said diode cathode to said timer IC threshold terminal;
a first resistor;
a second resistor;
a variable resistor having a first fixed terminal, a second fixed terminal, and a variable terminal;
means for connecting said timer IC discharge terminal to said variable resistor variable terminal;
means for connecting said first resistor between said timer IC Vcc terminal and said variable resistor first fixed terminal;

means for connecting said second resistor between said timer IC threshold terminal and said variable resistor second fixed terminal;

a NPN transistor having a base terminal, collector terminal, and emitter terminal;

a fourth resistor;

means for connecting said fourth resistor between said timer IC output terminal and said NPN transistor base terminal;

means for connecting said NPN transistor emitter terminal to ground;

a inductor having a first terminal and a second terminal;

means for connecting said inductor first terminal to said NPN transistor collector terminal;

a reversible motor having a first terminal and a second terminal;

a third capacitor;

means for connecting said third capacitor between said reversible motor first terminal and said reversible motor second terminal;

a relay having a first normally open contact with a first terminal and second terminal, a second normally open contact with a first terminal and a second terminal, a third normally closed contact with a first terminal and a second terminal, and a fourth normally closed contact with a first terminal and a second terminal;

means for connecting said relay first normally open contact between said reversible motor second terminal and ground;

means for connecting said relay third normally closed contact between said reversible motor first terminal and ground;

a fifth resistor having a first terminal and a second terminal;

means for connecting said relay second normally open contact between said reversible motor first terminal and said fifth resistor first terminal;

means for connecting said relay fourth normally closed contact between said reversible motor second terminal and said fifth resistor first terminal;

a switch having a first terminal and a second terminal;

a second variable resistor having a first terminal and a second terminal with means for varying the resistance between said first terminal and said second terminal;

means for connecting said second variable resistor first terminal to said switch first terminal;

means for connecting said second variable resistor second terminal to said fifth resistor second terminal;

means for connecting said inductor second terminal to said switch first terminal;

means for connecting said timer IC Vcc terminal to said switch first terminal.

2. A device as recited in claim 1, further including:

a power source having a positive terminal and a negative terminal;

means for connecting said switch second terminal to said power source positive terminal;

means for connecting said power source negative terminal to ground.

3. In an electric, gear driven, variable speed device that rotates a toy to amuse cats, a frequency oscillator circuit for controlling the direction and speed of the variable speed device comprising:

a 7555 timer IC, having a ground (1), trigger (2), output (3), reset (4), control V (5), threshold (6), discharge (7), and Vcc (8) terminals;

means for connecting said 7555 timer IC ground (1) terminal to ground;

a first capacitor (C1);

means for connecting said first capacitor (C1) between said 7555 timer IC trigger (2) terminal and ground;

a second capacitor (C2);

means for connecting said second capacitor (C2) between said 7555 Timer IC control V (5) terminal and ground;

means for connecting said 7555 timer IC trigger (2) terminal to said 755 timer IC threshold (6) terminal;

a diode (D1) having an anode and a cathode;

means for connecting said diode anode to said 7555 timer IC discharge (7) terminal;

means for connecting said diode cathode to said 7555 timer IC threshold (6) terminal;

a first resistor (R1);

a second resistor (R2)

a variable resistor (R3) having a first fixed terminal, a second fixed terminal, and a variable terminal;

means for connecting said 7555 timer IC discharge (7) terminal to said variable resistor (R3) variable terminal;

means for connecting said first resistor (R1) between said 7555 timer IC Vcc (8) terminal and said variable resistor (R3) first fixed terminal;

means for connecting said second resistor (R2) between said 7555 Timer IC threshold (6) terminal and said variable resistor (R3) second fixed terminal;

a NPN transistor having a base terminal, collector terminal, and emitter terminal;

a fourth resistor (R4);

means for connecting said fourth resistor (R4) between said 7555 Timer IC output (3) terminal and said NPN transistor base terminal;

means for connecting said NPN transistor emitter terminal to ground;

a inductor having a first terminal and a second terminal;

means for connecting said inductor first terminal to said NPN transistor collector terminal;

a reversible motor having a first terminal and a second terminal;

a third capacitor (C3);

means for connecting said third capacitor (C3) between said reversible motor first terminal and said reversible motor second terminal;

a relay having a first normally open contact with a first terminal and second terminal, a second normally open contact with a first terminal and a second terminal, a third normally closed contact with a first terminal and a second terminal, and a fourth normally closed contact with a first terminal and a second terminal;

means for connecting said relay first normally open contact between said reversible motor second terminal and ground;

means for connecting said relay third normally closed contact between said reversible motor first terminal and ground;

a fifth resistor (R5) having a first terminal and a second terminal;

means for connecting said relay second normally open contact between said reversible motor first terminal and said fifth resistor (R5) first terminal;

means for connecting said relay fourth normally closed contact between said reversible motor second terminal and said fifth resistor (R5) first terminal;

a sixth variable resistor (R6) having a first and second terminal with means for varying the resistance between said first terminal and said second terminal;

means for connecting said sixth variable resistor (R6) first terminal to said fifth resistor (R5) second terminal;

a switch (S1) having a first terminal and a second terminal;

means for connecting said sixth variable resistor (R6) second terminal to said switch (S1) first terminal;

means for connecting said inductor (K1) second terminal to said switch (S1) first terminal;

means for connecting said 7555 timer IC Vcc (8) terminal to said switch (S1) first terminal.

4. A device as recited in claim 3, further including:

a power source having a positive terminal and a negative terminal;

means for connecting said switch (S1) second terminal to said power source positive terminal;

means for connecting said power source negative terminal to ground.

5. In an electric, gear driven, variable speed device that rotates a toy to amuse cats, a frequency oscillator circuit for controlling the direction and speed of the variable speed device comprising:

a 7555 Timer IC, having a ground (1), trigger (2), output (3), reset (4), control V (5), threshold (6), discharge (7), and VCC (8) terminals;

means for connecting said 7555 Timer IC ground (1) terminal to ground;

a 200 uFds capacitor (C1);

means for connecting said 200 uFds capacitor (C1) between said 7555 Timer IC trigger (2) terminal and ground;

a 0.01 uFds capacitor (C2);

means for connecting said 0.01 uFds capacitor (C2) between said 7555 Timer IC control V (5) terminal and ground;

means for connecting said 7555 Timer IC trigger (2) terminal to said Timer IC threshold (6) terminal;

a diode (D1) having an anode and a cathode;

means for connecting said diode anode to said 7555 Timer IC discharge (7) terminal;

means for connecting said diode cathode to said 7555 Timer IC threshold (6) terminal;

a first 10 Kohm resistor (R1);

a second 10 Kohm resistor (R2)

a variable 20 Kohm resistor (R3) having a first fixed terminal, a second fixed terminal, and a variable terminal;

means for connecting said 7555 Timer IC discharge (7) terminal to said variable 20 Kohm resistor (R3) variable terminal;

means for connecting said first 10 Kohm resistor (R1) between said 7555 Timer IC Vcc (8) terminal and said variable 20 Kohm resistor (R3) first fixed terminal;

means for connecting said second 10 Kohm resistor (R2) between said 7555 Timer IC threshold (6) terminal and said variable 20 Kohm resistor (R3) second fixed terminal;

a MPS 222 NPN transistor (T1) having a base terminal, collector terminal, and emitter terminal;

a third 10 Kohm resistor (R4);

means for connecting said third 10 Kohm resistor (R4) between said 7555 timer IC output (3) terminal and said MPS 222 NPN transistor (T1) base terminal;

means for connecting said MPS 222 NPN transistor (T1) emitter terminal to ground;

a inductor (K1) having a first terminal and a second terminal;

means for connecting said inductor first terminal to said MPS 222 NPN transistor (T1) collector terminal;

a reversible motor (M1) having a first terminal and a second terminal;

a first 47 uFds capacitor (C3);

means for connecting said first 47 uFds capacitor (C3) between said reversible motor (M1) first terminal and said reversible motor (M1) second terminal;

a relay having a first normally open contact with a first terminal and second terminal, a second normally open contact with a first terminal and a second terminal, a third normally closed contact with a first terminal and a second terminal, and a fourth normally closed contact with a first terminal and a second terminal;

means for connecting said relay first normally open contact between said reversible motor (M1) second terminal and ground;

means for connecting said relay third normally closed contact between said reversible motor (M1) first terminal and ground;

a fourth 13 ohm resistor (R5) having a first terminal and a second terminal;

means for connecting said relay second normally open contact between said reversible motor first terminal and said fourth 13 ohm resistor (R5) first terminal;

means for connecting said relay fourth normally closed contact between said reversible motor second terminal and said fourth 13 ohm resistor (R5) first terminal;

a sixth variable 10 ohm resistor (R6) having a first terminal and a second terminal with means for varying the resistance between said first terminal and said second terminal;

means for connecting said sixth variable 10 ohm resistor (R6) first terminal to said 13 ohm resistor (R5) second terminal;

a switch (S1) having a first terminal and a second terminal;

means for connecting said sixth 10 ohm variable resistor (R6) second terminal to said switch (S1) first terminal;

means for connecting said inductor (K1) second terminal to said switch (S1) first terminal;

means for connecting said 7555 Timer IC Vcc (8) terminal to said switch (S1) first terminal.

6. A device as recited in claim 5 further including:

a power source having a positive terminal and a negative terminal;

means for connecting said switch (S1) second terminal to said power source positive terminal;

means for connecting said power source negative terminal to ground.

7. A device as recited in claim 5, wherein said 200 uFds capacitor (C1) is greater than 10 uFds.

8. A device as recited in claim 5, wherein said 200 uFds capacitor (C1) is variable between 10 uFds and 500 uFds.

* * * * *